United States Patent [19]
Fretwell
[11] 3,919,650
[45] Nov. 11, 1975

[54] MARK FREQUENCY DETECTOR CIRCUIT

[75] Inventor: Richard D. Fretwell, Columbus, Ohio
[73] Assignee: MI², Columbus, Ohio

[22] Filed: Aug. 15, 1973
[21] Appl. No.: 388,635

[52] U.S. Cl. ................ 329/102; 307/243; 307/251; 325/322; 329/104
[51] Int. Cl. ............................................ H03d 3/14
[58] Field of Search.................... 329/103, 102, 104; 325/322, 324; 307/251, 243

[56] References Cited

UNITED STATES PATENTS

| | | | |
|---|---|---|---|
| 3,316,762 | 5/1967 | Westersten | 307/243 X |
| 3,586,989 | 6/1971 | Wheable | 307/251 X |
| 3,636,372 | 1/1972 | Hujita et al. | 307/251 |
| 3,646,587 | 2/1972 | Shaffstall et al. | 307/251 X |
| 3,651,892 | 3/1972 | Szabo et al. | 307/243 X |
| 3,714,470 | 1/1973 | Goldberg | 307/251 X |

*Primary Examiner*—Alfred L. Brody
*Attorney, Agent, or Firm*—Cennamo Kremblas & Foster

[57] ABSTRACT

A mark frequency detector circuit for a data coupler having originate and answer capabilities for communicating with another remote data terminal or digital computer over conventional telephone lines. A mark detector circuit to detect the mark frequency signals from those spurious or ambient noise signals that may pass through the data coupler receive frequency filter sections. The circuit per se utilizes a simple arrangement of a pair of FET switches and a pair of operational amplifiers; providing a voltage comparison to detect the presence or absence of a pure mark frequency signal.

8 Claims, 3 Drawing Figures

FIG. 1

MARK FREQUENCY DETECTOR CIRCUIT

BACKGROUND

Reference is made to the co-pending patent application Ser. No. 112,954, filed Feb. 5, 1971, in which I am a co-inventor. There is disclosed in said co-pending patent application the complete system for communicating digital information over the standard type of telephone and telephone link to a time-shared computer, teletypewriter, or other data terminal. The system includes an originate/answer capability with interchangeability of the originate and answer frequencies. The conversion of the digital signals in the local data terminal to frequency shift-keyed FSK signals in the transmitter section and the conversion of the FSK signals from the remote terminal into digital signals in both the originate and answer modes of operation comprises the basic system.

The "originate" mode of operation is distinguished from the "answer" mode of operation and vice versa in that the frequencies of the transmit and receive signals are interchanged so the transmitter of one is on the same frequency as the receiver of the other. The data call may be initiated at either end for manual or automatic answering and automatic disconnect at the other end.

The transmit section of the data coupler system converts the data terminal digital signals, by way of a terminal interface, into a FSK carrier whose frequencies are in accordance with the following table:

| | ORIGINATE MODE | | ANSWER MODE | |
|---|---|---|---|---|
| | MARK | SPACE | MARK | SPACE |
| UPRIGHT | 1270hz | 1070hz | 2225hz | 2025hz |
| INVERTED | 1070hz | 1270hz | 2025hz | 2225hz |

The receive section of the data coupler system converts the FSK signals from the telephone line into digital data. The digital data is sent to the local data terminal. The received FSK carrier frequencies are in accordance with the following table:

| | ORIGINATE MODE | | ANSWER MODE | |
|---|---|---|---|---|
| | MARK | SPACE | MARK | SPACE |
| UPRIGHT | 2225hz | 2025hz | 1270hz | 1070hz |
| INVERTED | 2025hz | 2225hz | 1070hz | 1270hz |

Upright versus inverted frequency operation is distinguished by noting that the two mark and space frequencies in each band are simply interchanged.

The data coupler discrimination converts the FSK carrier signals into dc voltage levels corresponding to the mark and space digital signals.

There is also disclosed in the aforementioned system an originate or answer line filter, and an originate and answer receive filters. The line and receive filters are intended to reject adjacent frequencies providing attenuation above the passband and below the passband. Although the filters do limit the signals to those desired frequencies, it is not uncommon that spurious and ambient noise signals will pass through the filters and trigger the carrier detector falsely.

OBJECTS

It is accordingly a principal object of the present invention to provide a circuit operable to detect the mark and space signals in a distinguishing manner from spurious and ambient noise signals.

It is a further object of the present invention to provide a mark and space signal circuit that is extremely accurate and inexpensive to manufacture and avoids the use of additional filtering circuits.

Further objects and features of the present invention will become apparent from the following detailed description when taken in conjunction with the drawings in which:

DETAILED DESCRIPTION OF THE DRAWINGS

Figures 1, 2, 3:
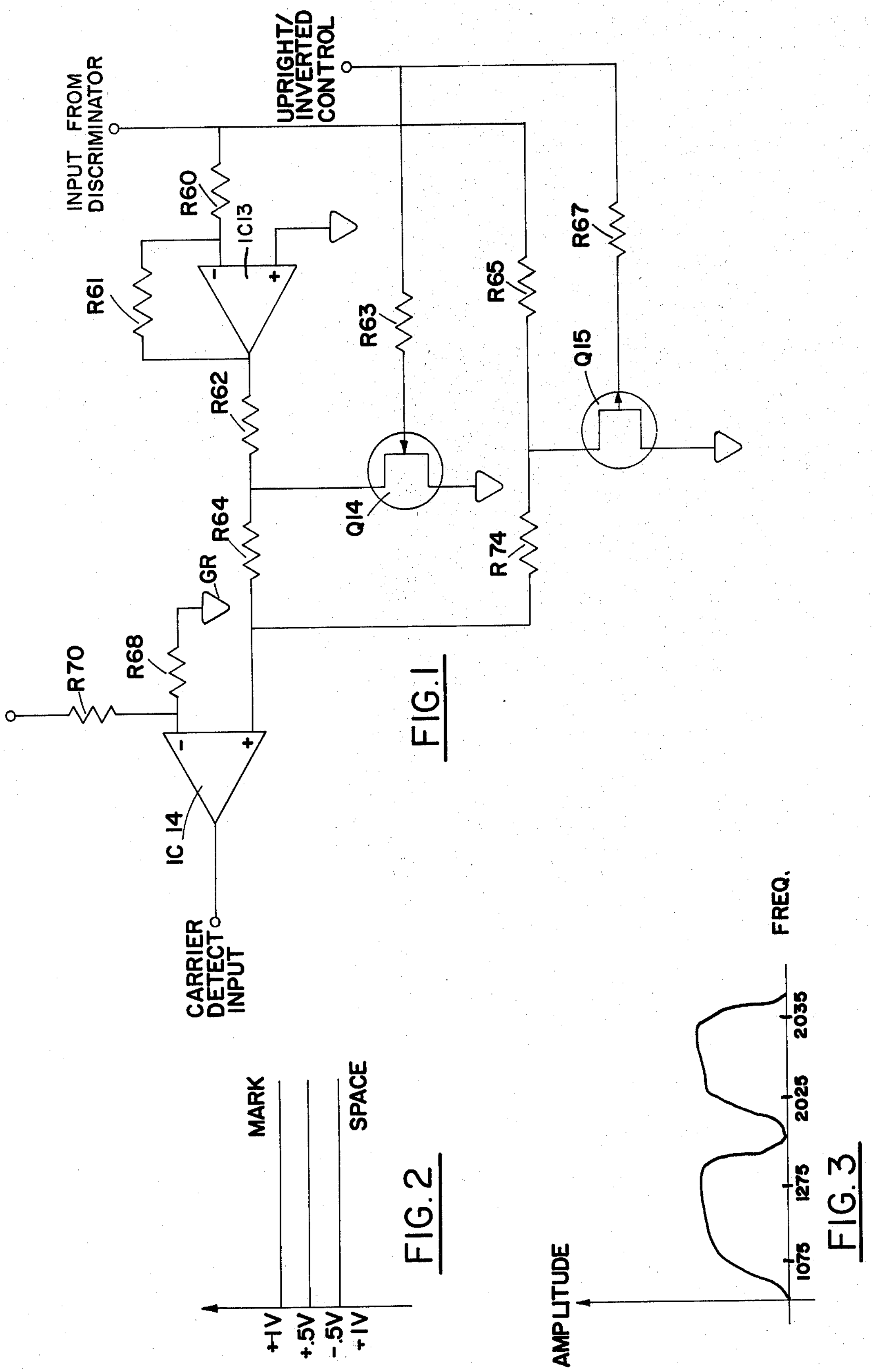
FIG. 1 is a preferred embodiment of the circuit of the present invention.
FIG. 2 is a mark and space voltage curve as seen at the output of the data cupler discriminator.
FIG. 3 is a waveform illustrating the receive filter passbands.

With particular reference now to the figures and specifically FIG. 1 - the preferred circuit of the present invention shown may now be described. Referring initially to the graph of FIG. 2 reception of the mark frequency by the data coupler receiver in the upright mode is represented by a continuous positive one volt signal at the output of the discriminator whereas the space frequency is a continuous minus one volt signal. In the inverted mode the mark frequency is seen as a minus one volt signal and the space frequency as a plus one volt signal. With reference to FIG. 3 the input passband frequencies are represented. The 1070 and 2025 signals are the space frequencies passbands whereas the 270 and 225 signals are the mark frequencies passbands.Any frequency received that is between the mark and space frequency will be received as a dc signal proportionally located between plus and minus one volt. For example - if 2125hz is received in the originate mode the output of the discriminator will be zero volts.

In the upright mode of operation FET Q14 is turned on and FET Q15 is turned off. In this mode the discriminator positive output signal is connected to the comparison amplifier IC14 directly and the output of the inverting amplifier IC13 is shunted to ground. Resistor R64 is significantly larger than resistor R74 plus resistor R65 and has little effect on the signal level at the input of IC14.

In the inverted mode of operation FET Q14 is turned off and FET Q15 is turned on. In this mode the discriminator negative output signal is connected to comparison amplifier IC14 through the inverting amplifier IC13 and the direct discriminator output is shunted to ground through resistor R65. The inverting amplifier has a voltage gain of ten as determined by the ratio fo resistor R61 to resistor R60. Resistors R64, R62 and R74 form a attenuator value of ten. As a result the input to the comparison amplifier is the same value in both the upright and inverted modes of operation.

The comparison amplifier IC14 compares the discriminator output voltage to a reference voltage determined by resistors R68 and R70. For example, if it was required to detect the mark frequency ±50hz the reference voltage would be set to +0.5 dc and any signal within this band would cause the output of IC14 to be positive thereby enabling the carrier detector. If for any reason the signal falls below the predetermined level the output of IC14 will switch negative and disable the carrier detector. It can be appreciated that noise signals will have frequency components below the mark frequency and will cause the carrier detector enable to be a negative voltage thereby disabling the carrier detector.

The carrier detector circuit of the data coupler is designed so that the carrier detect enable input must be continuously positive for a predetermined period of time before the data coupler is allowed to receive data. If a mark frequency is received continuously for this period of time the carrier detector places a positive voltage on the mark detect inhibit line thereby disabling the mark detector and allowing normal reception of mark and space data signals. Although a certain and specific preferred embodiment is shown and described it is to be understood that variations in switching and comparison circuit components may be had without departing from the true spirit and scope of the present invention.

I claim:

1. A mark frequency detector circuit for a data coupler for detecting mark and space frequency signals comprising:

ground means, input means for receiving a positive signal indicative of a mark frequency in the upright mode of operation and a negative signal as a space frequency and a negative signal indicative of a mark frequency in the inverted mode of operation and a positive signal as a space frequency, said signals having a representative value;

a first and second switching means receiving said input signals, the first of said switching means operative in response to said positive signal and the second of said switching means operative in response to said negative signal;

inverting means having the output of said negative responsive switching means connected thereto and voltage comparison means having the output of said inverting means connected thereto;

in upright mode of operation said positive output of said input means is connected to said voltage comparison means and the output of said inverter is shunted to said ground means, reference voltage determining means connected to said voltage comparison means for comparing the output signals from said switching means with a reference voltage.

2. The detector circuit of claim 1 wherein said comparison means is an operational amplifier and the input thereto is the same value both in the upright and inverted modes of operation.

3. The detector circuit of claim 1 wherein said inverter means is an operational amplifier.

4. The detector circuit of claim 1 wherein said switching means are field effect transistors (FET).

5. The detector circuit of claim 4 wherein one of said FET switches is of a P-channel type.

6. The detector circuit of claim 4 wherein one of said FET switches is of a N-channel type.

7. The detector circuit of claim 1 wherein said representative value is equal to that of said reference voltage.

8. The detector circuit of claim 7 wherein said reference voltage is set by appropriately valued resistive elements.

* * * * *